May 19, 1964 S. BOGOFF ET AL 3,134,089

SIGNAL APPARATUS

Filed Oct. 13, 1960

INVENTORS.
STANLEY BOGOFF
PAUL MEYERS

BY [signature]

ATTORNEY

United States Patent Office 3,134,089
Patented May 19, 1964

3,134,089

SIGNAL APPARATUS

Stanley Bogoff, 601 E. 55th St., Brooklyn 3, N.Y., and Paul Meyers, 2844 W. 29th St., Brooklyn 24, N.Y.

Filed Oct. 13, 1960, Ser. No. 62,416
8 Claims. (Cl. 340—44)

The present invention relates to oral traffic signal apparatus particularly for providing audible messages to pedestrians or motorists in conjunction with visual traffic signals, or instead of visual signals.

According to the invention audible traffic signals are issued in synchronism with visible traffic signals. The audible signals may be "Wait," "Walk," and "Dont Walk," etc. More specific signals such as "Cross Main Street" "Cross First Street" may be given audibly. The signals are produced preferably by a magnetic tape reproducer having a continuous tape containing the required audible signals. The reproducer is provided with circuits for synchronizing its operation with the visual traffic signals so that the several recorded messages are reproduced in a properly timed relationship to the visual traffic signals.

It is a general object of the present invention to provide improved traffic signals by adding audible instructions.

It is another object of the invention to provide improved means for establishing and maintaining synchronization, particularly between two sets of periodic signals.

Other objects and advantages of the invention will become apparent and the invention itself fully understood from the following description and drawing, wherein.

Figures 1, 2, 3:
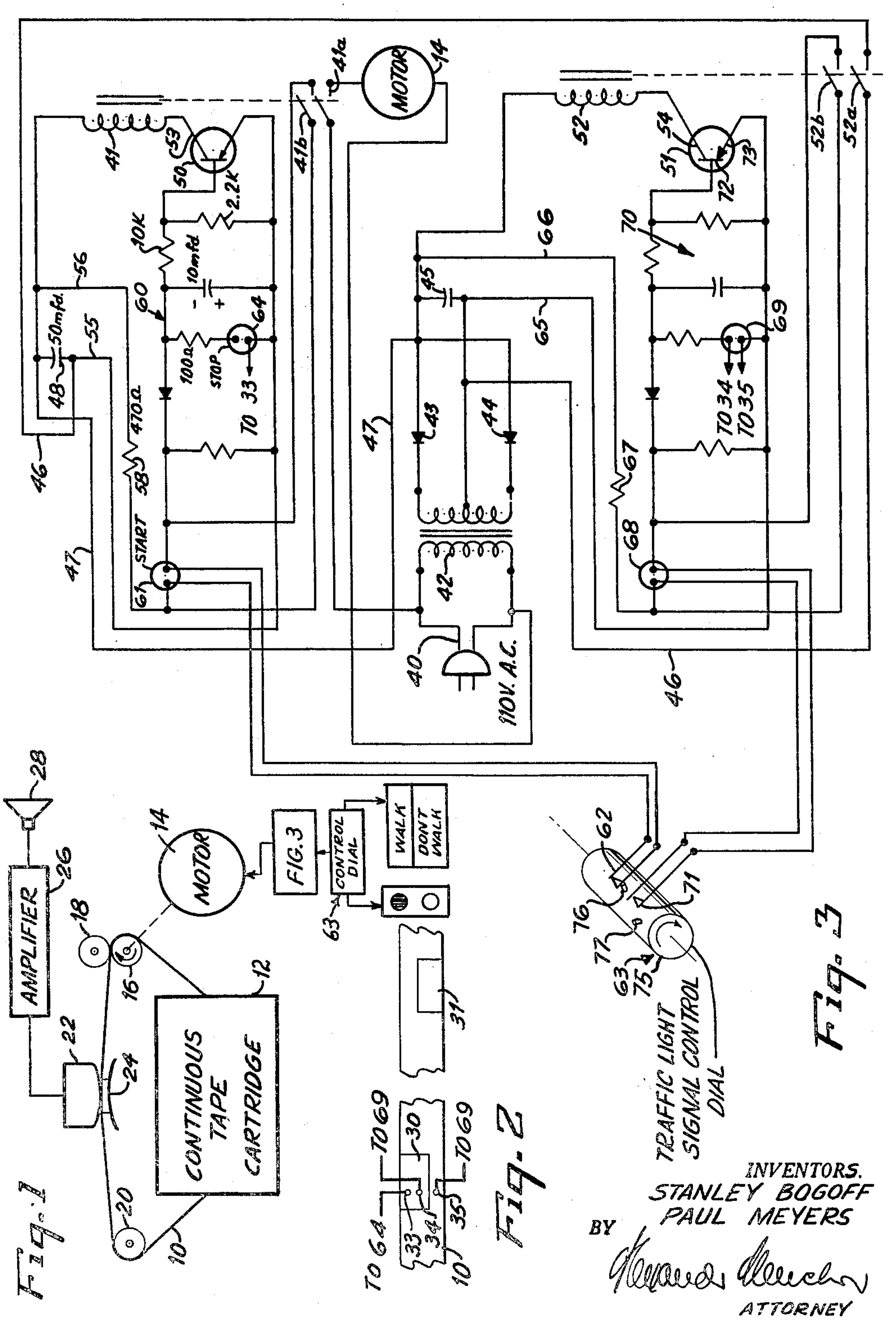
FIG. 1 is a schematic diagram of a magnetic tape sound-reproducer.
FIG. 2 is a view of the tape and the contacts thereon.
FIG. 3 is a circuit diagram of the synchronization apparatus.

Referring to the drawing, a magnetic tape recorder is provided, having a continuous loop magnetic tape 10 stored in a suitable cartridge 12 which automatically feeds and rewinds the tape. A motor 14 drives the tape by turning a capstan 16 operating against a rubber pinch roller 18. The tape 10 moves over suitable idlers such as 20 past the pickup head 22, against which it is held by a resilient pad 24, in a known manner. The recorded messages are fed by pickup head 22 to amplifier 26 and then to one or more transducers as loudspeakers 28, which are preferably directional. As shown in FIG. 2, tape 10 is provided with conductive strips 30 and 31 which close stop contacts 32, 33, and 34 for stopping the recorder at the end of a message, in a manner which will be described fully later on.

A dual synchronizing unit controls the operation of the recorder to synchronize the messages with the visual signals and restart the recorder, in synchronism when power is restored after a power interruption. The circuitry of the synchonizing unit is shown in FIG. 3. A power line 40 is connected to motor 14 of the recorder through contacts 41*a* of relay 41. The power line is also connected to a full wave rectifier which includes transformer 42, rectifiers 43 and 44, a capacitor 45 and output leads 46 and 47. These output leads have a capacitor 48 shunted thereacross and are connected to the current amplifiers or transistors 50 and 51. Relays 41 and 52 are connected to the collectors 53 and 54 of the transistors.

The input of transistor 50 is supplied from the output of power rectifier 42—47 by conductors 53 and 56 through a resistor 58 and suitable input circuit 60, including start contact connector 61 having leads extending to start switch 62. When start switch 62 is closed momentarily by a traffic signal controller 63, a voltage pulse is applied through input circuit 60 to the emitters and base electrodes to make transistor 50 conductive and operate relay 41, closing contacts 41*a* to start motor 14. At the same time contacts 41*b* close across the terminals of connector 61 to maintain relay 41 energized and motor 14 in operation. This condition persists until the stop terminals of connector 64 are effectively shunted by conductive strip 30 on tape 10 at the end of a message. For this purpose terminals of connector 64 are connected to a pair of contacts adopted to be short circuited by conductive strip 30 on tape 10. It is found, however, sufficient to connect only the lower terminal of connector 64 to contact 33, because of other connections which will be described subsequently. The short circuiting of contacts 33 and 34 then effectively short circuit input circuit 60.

Transistor 51 is similarly connected by leads 65 and 66 to rectifier circuit 42—45 through resistor 67 and input circuit 70 containing start contacts 68 and stop contacts 69. The start contacts are closed for a short time by switch 71 of traffic light controller 63, while the stop contacts 69 are adapted to be closed by conductive strip 31 on the tape. The closing of start contacts 68 applies a voltage pulse between base and emitter electrodes 72 and 73, rendering the transistor conductive and operating relay 52. The energization of relay 52 closes contacts 52*a* and 52*b*. The latter then short circuit connector 68 and maintain transistor 51 conductive. Contacts 52*a* connect power rectifier 42—45 via leads 46 to the circuit of transistor 50. Relay 52 remains energized until contacts 69 are effectively short circuited by engagement of contacts 34 and 35 by conductive strip 31 on tape 10. Then transistor 51 is cut off, relay 52 drops out, opening contacts 52*a* and cutting off power to transistor 50, thereby opening relay 41 and removing power from motor 14.

The operation of the apparatus will be described now in detail. The traffic light controller 63 is of a conventional type. It may consist of a drum 75 driven at a constant speed, for example, by a synchronous motor. The controller includes a plurality of switches including normally open switches 62 and 71 adapted to be closed by pins 76 and 77 respectively. There may be a plurality of pins 76 round the circumference of drum 75 for closing switch 62 at the beginning of various traffic signal phases, such as "walk" and "don't walk" phases. A single pin 77 closes switch 71 once during each traffic signal cycle.

Now let us assume power is turned on and controller 63 is set in operation. Drum 75 rotates. The closing of switch 62 has no effect, because no power is supplied to transistor 50. When pin 77 closes switch 71 momentarily start contacts 68 are short circuited and a pulse is fed through input circuit 70 to transistor 51, rendering it conductive. Relay 52 is then operated, and through contacts 52*a* supplies power to transistor 50, while contacts 52*b* short circuit start contacts 68, so that the reopening of these contacts has no effect. As drum 75 continues to rotate, one of the pins 76 momentarily closes switch 62 across start contacts 61. Transistor 50 then conducts and energizes relay 41, and this in turn connects motor 14 to power line 40. The sound-reproducer is then operated and tape 10 is driven until, say, a conductive strip 30 short circuits contacts 33 and 34 and effectively short circuits the emitter-base circuit 60. Relay 41 will then be de-energized, and remove power from motor 14. Upon coasting and before motor 14 comes to rest, however, tape 10 will have been advanced until the conductive strip has passed contacts 33—35, and the short circuit across circuit 60 is removed.

When switch 62 is closed again by another pin 76, the same operation as that described above will occur. This action will be repeated until contacts 34 and 35 are short circuited by conductive strip 31. Then input circuit 70 of transistor 51 will be short circuited and relay 52 will be de-energized, removing power from transistor 50 and relay 41, and hence also from motor 14. Again, the coasting of motor 14 will move the tape until conductive strip 31 passes contacts 33–35. Since strip 31 is at the end of a sequence of messages, the tape is now positioned to play or repeat another sequence of messages from the beginning. When contacts 68 are next short circuited, by closing switch 71 by pin 77 at the beginning of a new cycle of traffic signals, transistor 51 conducts and operates relay 52. At the desired time for the first oral message, pin 76 closes switch 62, causing relay 41 to close and start motor 14. The first recorded message on tape 10 is then reproduced in synchronism with the traffic signals.

It can be seen that even if the recorder and traffic controller should start out of synchronism, synchronism will be established within a portion of one traffic signal cycle and thereafter will be maintained, with re-synchronization at the end of each traffic signal cycle. If a condition, such as a power interruption at the traffic light controller should occur, synchronization would be re-established as described above when operation is resumed.

The transistor circuit of the invention enables relays 41 and 52 to be operated by the switching of very feeble currents at contacts 33—35. This obviates the possibility of burning the tape and the reduced life of contacts 33—35 which would result if they switched large currents such as would be necessary to operate relays 41 and 52 directly.

Although the invention has been described particularly with reference to traffic lights, it will be evident that the invention can be utilized for other types of programmed or synchronized control of apparatus, particularly motor driven apparatus. Since many variations and modifications of the embodiment herein disclosed will be readily apparent to those skilled in the art, it is to be clearly understood that the invention is not to be construed as limited, except as defined in the claims.

What is claimed is:

1. A traffic signalling system including a visible signal having at least two indications and an audible signal comprised of at least two tape recorded verbal messages correlated to the visible signal comprising in combination, a tape transducer including a single tape loop carrying the recorded messages, a motor for driving the tape loop, means including an electrical power circuit for supplying power to said motor, a first relay having normally open contacts in said electrical power circuit, a first current amplifying device having a first output circuit including the winding of said relay, first central electrodes for said current amplifying device, a first input circuit connected to said electrodes, said first input circuit including a first start switch for closing said first input circuit and a first stop switch for shunting said first input circuit, a second current amplifying device, second control electrodes for said second current amplifying device, a second input circuit connected to said second electrodes, said second input circuit including a second start switch for closing said second input circuit and a second stop switch for shunting said second input circuit, a second output circuit for said second circuit amplifying device, a second relay in said second output circuit, a source of voltage connected to said second input circuit, timed means operatively associated with said visible signal for sequentially operating said first and second start switches, and means carried by said tape loop for selectively operating said stop switches in timed relation to the visible signals.

2. A system according to claim 1, wherein the means for operating said start switches is a traffic light controller.

3. A system according to claim 1, wherein the means for operating said stop switches is a traffic light signal control dial and wherein said means for operating said stop switches includes a plurality of adjacent contacts engaging the tape, and conductive portions on said tape at the ends of recorded messages located to short circuit selected pairs of said contacts.

4. A system according to claim 1 wherein said current amplifying devices are transistors.

5. A system according to claim 1, wherein said means for operating the start switches only close said switches momentarily, said relays including normally open contacts connected in parallel with said start switches.

6. A system comprising a motor, a relay having normally open contacts in series with said motor for interrupting the supply of power thereto, a first current amplifying device having an output circuit including the winding of said relay, said current amplifying device having control electrodes and an input circuit connected to said electrodes, including a first start switch for completing said input circuit and a first stop switch for shunting said circuit, a second current amplifying device and a second input circuit connected to the control electrodes of said second current amplifying device and having a second start and a second stop switch similarly to the first input circuit, a source of voltage connected to the second current amplifying device and the second input circuit, a relay in the output circuit of the second current amplifying device having contacts connecting said source of voltage to said first discharge device and said first input circuit, means for operating said start switches in a timed relationship, and means connected to be driven by said motor for selectively operating said stop switches in a timed relationship.

7. An audible traffic signal system comprising a magnetic tape transducer including a motor for driving the motor, a relay having normally open contacts in series with said motor for interrupting the supply of power thereto, a first transistor having an output circuit including the winding of said relay, said transistor having control electrodes, and an input circuit connected to said electrodes, including a first start switch for completing said input circuit and a first stop switch for shunting said circuit, a second transistor and a second input circuit connected to the control electrodes of said second transistor and having a second start and a second stop switch similarly to the first input circuit, a source of voltage connected to the second transistor, a relay in the output circuit of the second transistor having contacts connecting said source of voltage to said first transistor, visual traffic signal controller means operating said start switches in synchronism with the visual traffic signals, and means in said magnetic tape transducer for selectively operating said stop switches in a timed relationship.

8. An audible traffic signal system comprising sound reproducing means for repeatedly producing a series of verbal messages, a visual traffic light controller, means including a time controlled electric circuit and a relay controlled circuit actuable by the time controlled circuit. connecting said controller to said sound reproducing means for synchronizing said messages with the traffic lights and means establishing synchronism between said reproducing means and the traffic lights when electric power is applied to start the sound reproducing means through closure of said relay controlled circuit.

References Cited in the file of this patent

UNITED STATES PATENTS

| | | |
|---|---|---|
| 1,704,104 | Ruddick | Mar. 5, 1929 |
| 1,997,778 | Massey | Apr. 16, 1935 |
| 2,206,998 | Beizer | July 9, 1940 |
| 2,396,409 | Berger | Mar. 12, 1946 |
| 2,793,356 | Hart | May 21, 1957 |
| 2,847,513 | Schlafly | Aug. 12, 1958 |
| 2,991,448 | Diamond | July 4, 1961 |